United States Patent [19]

McKean

[11] 4,371,354

[45] Feb. 1, 1983

[54] CONTROLLED-TORQUE APPARATUS

[75] Inventor: John A. McKean, Fairview, Pa.

[73] Assignee: Titan Tool Co., Fairview, Pa.

[21] Appl. No.: 221,322

[22] Filed: Dec. 29, 1980

[51] Int. Cl.³ .............................................. F16D 3/56
[52] U.S. Cl. .................................. 464/36; 192/56 R; 464/39
[58] Field of Search ................................. 464/35–39; 81/473–475; 192/56 R

[56] References Cited

U.S. PATENT DOCUMENTS

| | | | |
|---|---|---|---|
| 1,608,113 | 11/1926 | Nace et al. | 64/29 X |
| 1,920,017 | 7/1933 | McClatchie | 64/29 X |
| 1,936,665 | 11/1933 | Gauthier | 192/56 R X |
| 2,182,627 | 12/1939 | Gauld | 192/56 R |
| 2,238,583 | 4/1941 | Dodge | 64/29 |
| 2,537,422 | 1/1951 | Ridge | 192/56 R |
| 2,600,327 | 6/1952 | Ridge | 81/475 |
| 2,724,299 | 11/1955 | Amtsberg | 81/475 |
| 2,819,635 | 1/1958 | Better et al. | 64/29 |
| 2,966,973 | 1/1961 | Hayes | 192/56 R |
| 3,702,546 | 11/1972 | Schnepel | 64/29 |
| 3,787,136 | 1/1974 | Steiner | 192/56 R X |
| 3,937,036 | 2/1976 | Sauerwein | 464/36 |
| 3,979,925 | 9/1976 | Kato | 64/29 |
| 4,041,729 | 8/1977 | Bilz | 64/29 |

FOREIGN PATENT DOCUMENTS

| | | |
|---|---|---|
| 846352 | 8/1960 | United Kingdom . |
| 855922 | 12/1960 | United Kingdom . |
| 1391176 | 4/1975 | United Kingdom . |
| 1532873 | 11/1978 | United Kingdom . |

OTHER PUBLICATIONS

The "Titan Torker" controlled Torque Driver Brochure; Feb. 1980.

Primary Examiner—John Petrakes
Attorney, Agent, or Firm—Stevens, Davis, Miller & Mosher

[57] ABSTRACT

A controlled-torque apparatus having a first cylindrical member and a second cylindrical member held together by means of a ball bearing positioned in a hole in the sidewall of the second cylindrical member cooperating with a bearing race on the interior sidewall of the first cylindrical member, thus longitudinally securing while allowing relative rotation. The torque control is provided by a spring which exerts vertical pressure on ball bearings extending through apertures in the base of the second cylindrical member into part-spherical recesses in the base of the first cylindrical member.

7 Claims, 3 Drawing Figures

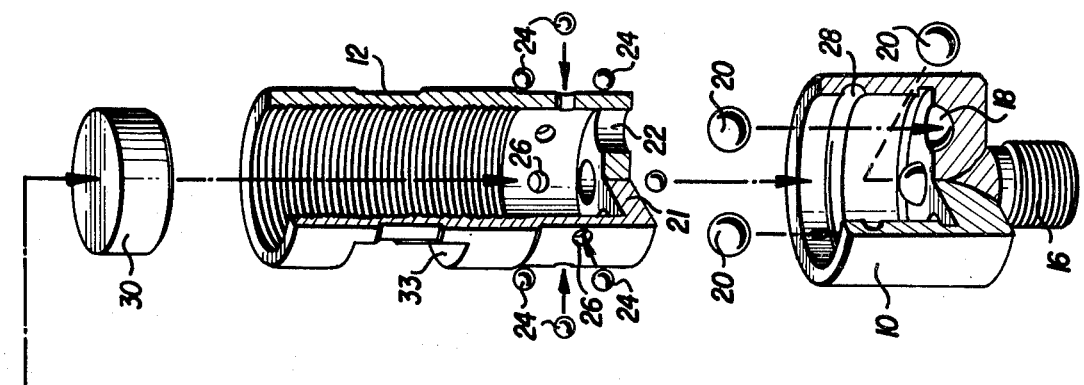
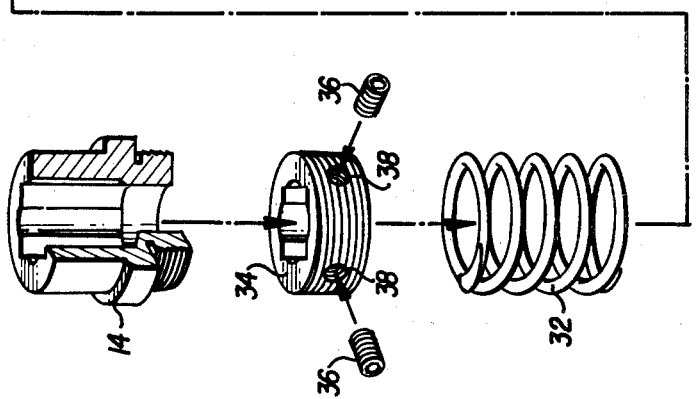
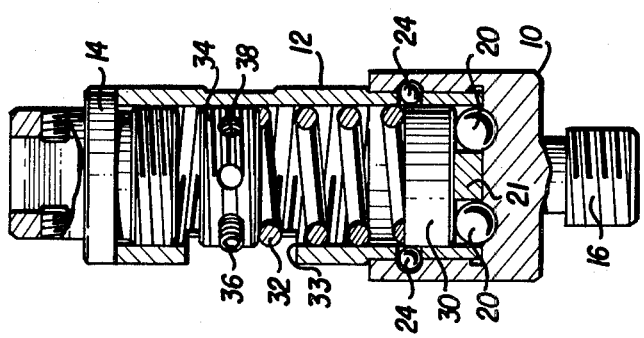
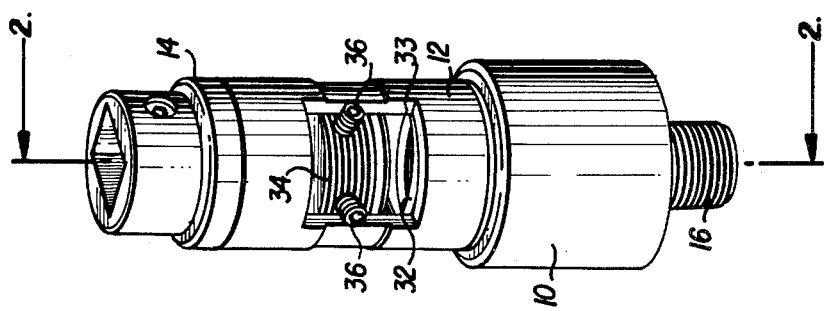

CONTROLLED-TORQUE APPARATUS

BACKGROUND OF THE INVENTION

1. Field of the Invention

The present invention relates to a controlled-torque apparatus, and more particularly, to a less bulky controlled-torque apparatus designed to be more easily useable in situations where a tool must work in close quarters.

2. Description of the Prior Art

In the past, multi-piece controlled-torque apparatuses of this type have been held together by means of an external sleeve and collar arrangement. This bulky arrangement has led to difficulties in utilization in places such as assembly lines, where a tool may be required to fit into tight places. In addition, frictional contact between the sleeve and collar caused the prior art apparatuses to generate a considerable amount of heat and to thus operate at detrimental high temperatures.

SUMMARY OF THE INVENTION

It is an object of the present invention to provide a controlled-torque apparatus having a slimmer configuration than previously known devices.

It is a further object of this invention to provide a slimmer controlled-torque apparatus of uncomplicated construction.

It is a still further object of this invention to provide a slimmer controlled-torque apparatus which is simple and economical to manufacture.

It is a still further object of this invention to provide a controlled-torque apparatus which operates at considerably lower temperatures than prior art apparatuses because of considerably lower heat generation in use.

The above objects and others are obtained by providing a controlled-torque apparatus which has two major parts, a cylindrical base and a cylindrical sleeve fitting within the base. This sleeve is longitudinally secured but rotatable relative to the base because of the cooperation of a support bearing located in a hole in the sidewall of the sleeve with a bearing race formed in the interior sidewall of the base.

Torque is preferably transmitted between the base and sleeve by means of torque transmission bearings extending through apertures in the bottom of the sleeve into part-spherical recesses in the base. A compression spring supplies vertical force to the torque transmission bearings, urging them into the recesses. Upon the application of excess torque, the torque transmission bearings are forced upward against the force of the spring by the part-spherical recesses, allowing relative rotation between the base and the sleeve. An adjustment nut may be provided to allow changing of the force applied by the spring.

BRIEF DESCRIPTION OF THE DRAWINGS

FIG. 1 is a perspective view of the apparatus of the present invention.

FIG. 2 is a sectional side view taken along line 2-2 of FIG. 1.

FIG. 3 is an exploded view of an apparatus of the present invention.

DESCRIPTION OF THE PREFERRED EMBODIMENT

Referring to the drawings, the preferred embodiment of the controlled-torque apparatus of the present invention has two major parts, a cylindrical base 10 and a cylindrical sleeve 12. Sleeve 12 is relatively rotatable to but longitudinally secured within base 10 as will be more fully explained later. Two engaging means 14 and 16 are provided on opposite ends of the tool to allow for connection to a torque supplier and a tool to be driven. Examples of such engaging means as shown include threaded members 16 and socket engaging head 14. The specific choice of engaging means will of course depend upon the specific use and tools involved. When socket engaging head 14 is used, it is preferable that engaging head 14 be externally threaded to cooperate with an internally threaded sleeve 12.

Sleeve 12 is longitudinally held in but relatively rotatable to base 10 by the cooperation of support bearings 24 with bearing race 28 into the sidewall of base 10. Support bearings 24 are located in holes 26 into the sidewall of sleeve 12, and are held in place into the holes by disk 30. Disk 30 also serves as a spring shoe for spring 32 in the preferred embodiment, as will be more fully explained later. Thus, longitudinal movement of sleeve 12 is prevented by the engagement of support bearings 24 with bearing race 28, while relative rotation is not inhibited. The size and number of holes and support bearings will of course vary depending upon the size of the apparatus being manufactured and its intended use.

Torque is transmitted between base 10 and sleeve 12 through torque transmission bearings 20. These torque transmission bearings rest in part-spherical recesses 18 in base 10 and extend into apertures 22 in bottom 21 of sleeve 12. The sum of the depth of recesses 18 and the thickness of bottom 21 should be equal to or substantially the same as the diameter of torque transmission bearings 20.

Vertical force from compression spring 32 is transmitted to torque transmission bearings 20 by means of spring shoe 30. This force urges torque transmission bearings 20 into part-spherical recesses 18. As indicated above, in the preferred embodiment, the spring shoe also serves as a retaining disk for support bearings 24 although other suitable setups, such as a thin walled, hollow, cylindrical retainer and a thin spring shoe are readily ascertainable.

It is advantageous (although not essential) for the force applied by compression spring 32 to be variable. In the present invention, the force is preferably varied by means of adjuster 34, whose external threads can cooperate with an internally threaded sleeve 12. The adjuster can be readily rotated to adjust the spring force by insertion and movement of a long narrow object in threaded holes 38. This is facilitated by the plurality of threaded holes 38 and the provision of opening 33 into the sidewall of sleeve 12. Removable set screws 36, which fit in threaded holes 38 and extend through opening 33, can secure the adjuster 34 against unintentional rotation.

Upon the presence of excess torque between sleeve 12 and base 10, torque transmission bearings 20 are forced upwards against the pressure of spring 32. This allows the torque transmission bearings 20 to slip, and the sleeve thus rotates with respect to base 10. This provides an indication that the proper amount of torque has been applied and prevents application of too much torque. By securing sleeve 12 within base 10 by means of the cooperation of support bearings 24 with bearing race 28 on the interior sidewall of base 10, the bulky, external sleeve and collar arrangement of the prior art has been eliminated. The apparatus of the present invention is slimmer and useable in a wider variety of applications at lower temperature with less heat generation than the prior art.

What is claimed is:

1. A controlled torque apparatus comprising:
a first substantially cylindrical member having an open end, a closed end and a sidewall;
a second substantially cylindrical member having a closed end and a sidewall, the closed end of said second cylindrical member fitting within the open end of said first cylindrical member;
torque overload-responsive clutch means interposed between said first and second cylindrical members;
means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:
an aperture through the sidewall of said second cylindrical member;
a ball bearing disposed in said aperture, the sidewall of said second cylindrical member having a thickness less than the diameter of the ball beaing;
an annular bearing race formed on the inner surface of the sidewall of said first cylindrical member corresponding to said aperture; and
ball bearing retaining means located within said second cylinder to retain said ball bearing in said aperture.

2. A controlled torque apparatus comprising:
a first substantially cylindrical member having an open end, a closed end and a sidewall;
first engaging means extending from the exterior of the closed end of said first cylindrical member;
a second substantially cylindrical member having an open end, a closed end and a sidewall, the closed end of said second cylindrical member fitting within the open end of said first cylindrical member;
second engaging means extending from the open end of said second cylindrical member;
adjustable torque overload-responsive clutch means interposed between said first and second cylindrical members;
means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:
an aperture through the sidewall of said second cylindrical member;
a ball bearing disposed in said aperture, the sidewall of said second cylindrical member having a thickness less than the diameter of said ball bearing;
an annular bearing race formed on the inner surface of the sidewall of said first cylindrical member corresponding to said aperture; and
ball bearing retaining means located within said second cylindrical member to retain said ball bearing in said aperture.

3. A controlled torque apparatus comprising:
a first substantially cylindrical member having an open end, a closed end and a sidewall;
first engaging means extending from the exterior of the closed end of said first cylindrical member;
a second substantially cylindrical member having an open end, a closed end and a sidewall, the closed end of said second cylindrical member fitting within the open end of said first cylindrical member;
second engaging means extending from the open end of said second cylindrical member;
adjustable torque overload-responsive means comprising:
a part-spherical recess on the inner surface of the closed end of said first cylindrical member;
a hole through the closed end of said second cylindrical member corresponding to said recess;
a torque transmitting bearing located in said recess and said hole;
a spring disposed within said second cylindrical member to apply force to said torque transmitting bearing; and
adjustment means for changing the force applied by said spring;
means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:
an aperture through the sidewall of said second cylindrical member;
a ball bearing disposed in said aperture, the sidewall of said second cylindrical member having a thickness less than the diameter of the ball bearing;
an annular bearing race formed on the inner surface of the sidewall of said first cylindrical member corresponding to said aperture; and
ball bearing retaining means located within said second cylindrical member to retain said ball bearing in said aperture.

4. A controlled torque apparatus comprising:
a first substantially cylindrical member having an open end, a closed end and a sidewall;
first engaging means extending from the exterior of the closed end of said first cylindrical member;
a second substantially cylindrical member having an open end, a closed end and a sidewall, the closed end of said second cylindrical member fitting within the open end of said first cylindrical member;
second engaging means extending from the open end of said second cylindrical member;
adjustable torque overload-responsive means comprising:
a semi-spherical recess on the inner surface of the closed end of said first cylindrical member;
a hole through the closed end of said second cylindrical member corresponding to said recess;
a torque transmitting bearing located in said recess and said hole;
a spring disposed within said second cylindrical member to apply force to said torque transmitting bearing;
a substantially disk-shaped spring shoe disposed in said second cylindrical member between said spring and said torque transmitting bearing; and adjustment means to change the force applied by said spring;

means for securing said second cylindrical member within said first cylindrical member, said securing means connecting said first cylindrical member to said second cylindrical member so that first cylindrical member is longitudinally fixedly secured to said second cylindrical member but rotatable relative thereto and comprises:

an aperture through the sidewall of said second cylindrical member;

a ball bearing disposed in said aperture, the sidewall of said second cylindrical member having a thickness less than the diameter of said ball bearing;

an annular bearing race formed on the inner surface of the sidewall of said first cylindrical member corresponding to said aperture;

said spring shoe acting as a ball bearing retaining means to retain said ball bearing in said aperture.

5. A controlled torque apparatus as claimed in either claim 3 or claim 4 wherein said second cylindrical member is internally threaded and said adjustment means comprises an externally threaded nut disposed within said second cylindrical member.

6. A controlled torque apparatus as claimed in claim 5 wherein said second engaging means is threadably connected to said second cylindrical member.

7. A controlled torque apparatus as claimed in either claim 3 or claim 4 wherein the sum of the depth of said recess and the depth of said hole is substantially equal to the diameter of said torque transmitting bearing.

* * * * *